Patented Aug. 6, 1940

2,210,469

UNITED STATES PATENT OFFICE 2,210,469

MANUFACTURE OF ESTERS

Hanns Peter Staudinger, Ewell, England, assignor to The Distillers Company Limited, Edinburgh, Scotland, a British company No Drawing. Application December 6, 1938, Serial No. 244,290. In Great Britain January 1, 1938

6 Claims. (Cl. 260—486)

The present invention relates to the manufacture of esters of unsaturated acids and particularly but not exclusively to the production of esters of crotonic acid.

The usual method of producing esters by causing an alcohol and an acid to react in presence of an esterifying catalyst does not give satisfactory results when unsaturated acids are esterified, as in many instances the esters formed tend to polymerise or to resinify, probably owing to the presence of the esterifying catalyst which is usually of an acid nature.

According to the present invention esters of unsaturated acids are obtained by the interaction of an alcohol, an unsaturated aliphatic aldehyde, and oxygen or air in the presence of a non-acidic oxidation promoting catalyst or oxygen carrier such as manganese crotonate, manganese phosphate or copper crotonate.

The process can be applied for the production of esters of: aliphatic alcohols such as butyl alcohol and its homologues, polyhydric alcohols such as ethylene-glycol, glycerol and the like, aromatic alcohols such as benzyl alcohol, and cyclic alcohols such as cyclo-hexanol. The process has no practical importance in the production of the esters of low boiling point since these can be readily removed from the reaction zone in the normal methods of esterification involving no danger of resinification.

Suitable aldehydes are crotonaldehyde, methyl acrolein and other similar unsaturated aliphatic aldehydes. The reaction is carried out at moderate temperature and preferably below the boiling point of the aldehyde taking part in the reaction. The temperature employed will also depend on the nature of the alcohol undergoing esterification, but generally speaking temperatures from 50–150° C. are suitable. Reaction may be carried out at atmospheric or increased pressure but preferably atmospheric pressure is employed. Preferably an excess of alcohol is used.

Suitable oxidation promoting catalysts or oxygen carriers are manganese crotonate, manganese phosphate, copper crotonate and the like. The use of catalysts of an acid nature must be avoided.

The esterification may be effected by blowing oxygen or air into a heated mixture of the aldehyde and the alcohol to be esterified, or the mixture of aldehyde and alcohol may be caused to pass downwards through a packed column in counter-current to a stream of hot air or oxygen. Alternatively oxygen or air and the vapour of the aldehyde either in admixture or separately may be caused to pass into the heated alcohol.

The following example illustrates the manner in which the invention may be carried into effect.

Preparation of benzyl crotonate 250 grams of crotonaldehyde, 324 grams of benzyl alcohol, 200 cc. benzene, and 4 grams $MnO_2$ plus 3 grams $H_3PO_4$ (1.75) were heated in a two-neck flask. Through one neck of the flask air was introduced into the mixture at a rate of about 6 litres per hour. The other neck was connected to an entraining apparatus consisting of a receiver with drainage cock, a packed column and a condenser. After 14 hours heating the reaction was finished, as indicated by no more water passing over. The residue in the flask was washed several times with warm water, each time separating the reaction liquid from the water. The reaction liquid was dried by entraining with the residual benzene, and after drying the benzene was distilled off. The remaining liquid was fractionated under vacuum and the main fraction boiling between 158° C. and 170° C. at 45 mm. pressure was found to be almost pure benzyl crotonate. A high yield was obtained.

What I claim is:

1. The method of producing esters of unsaturated aliphatic acids which comprises essentially reacting an unsaturated aliphatic aldehyde, an alcohol, and oxygen at a temperature between about 50° and about 150° C. in the presence of a non-acidic oxidation-promoting catalyst.

2. The method of producing esters according to claim 1, in which the reaction is carried out at substantially atmospheric pressure.

3. The method of producing esters according to claim 1, the aldehyde used being crotonaldehyde.

4. The method of producing esters according to claim 1, which consists in blowing air into a heated mixture of the aldehyde and the alcohol.

5. The method of producing esters according to claim 1, which consists in causing a stream of hot air to ascend in countercurrent up a packed column down which passes a mixture of the aldehyde and alcohol.

6. The method of producing esters of unsaturated aliphatic acids which comprises essentially reacting an unsaturated aliphatic aldehyde, an alcohol, and an oxygen-containing gas of the group consisting of air and oxygen at a temperature between about 50° C. and about 150° C. in the presence of a non-acidic oxidation-promoting catalyst selected from the group consisting of manganese crotonate, manganese phosphate and copper crotonate.

HANNS PETER STAUDINGER.